United States Patent Office 3,586,708
Patented June 22, 1971

3,586,708
ARSANILIC ACID PRODUCTION PROCESS
Joseph W. Nemec, Rydal, and Harry R. Raterink, Drexel Hill, Pa., and Stanley W. Wise, Audubon, N.J., assignors to Rohm and Haas Company, Philadelphia, Pa.
No Drawing. Filed May 1, 1969, Ser. No. 821,142
Int. Cl. C07f 9/76, 9/78
U.S. Cl. 260—442                                            12 Claims

ABSTRACT OF THE DISCLOSURE

A process is provided for preparing arsanilic acid in yields of about 45% or higher, based on the weight of arsenic acid reactant, by reacting arsenic acid and aniline at a temperature of about 130° to 180° C. in the presence of a chelating agent and a solvent which forms an azeotropic distillate with water formed in the reaction. This reaction produces a mixture of arsanilic acid and di-(p-aminophenyl) arsenic acid, and the latter is converted to arsanilic acid by hydrolysis at an acid pH of about 2 to 3.

This invention relates to the production of arsanilic acid. More particularly, it relates to a process that achieves high yields of arsanilic acid by the reaction of arsenic acid with aniline in the presence of a solvent.

Para-aminophenyl arsenic acid, commonly known as "arsanilic acid," is a well-known and widely used organic arsenic compound. Arsanilic acid and related compounds prepared from it are used, for example, in the veterinary field to stimulate growth, control parasites in fowl and swine, and to increase egg production from fowl. For example, arsanilic acid reacts with potassium cyanate to yield N-carbamoyl-arsanilic acid, or carbarsome, which is used, e.g., as an intestinal amebicide and to treat histomoniasis in turkeys.

It has been difficult in the past, however, to achieve efficient and economical production of arsanilic acid because of the relatively low efficiency of the reactions used in its preparation, in terms of the percentage of the reactants converted to the desired arsanilic acid product. Although claims of higher yields have been made, it has generally been possible to achieve only about 25% conversion of arsenic acid to arsanilic acid by commercially useful prior art processes.

It is accordingly an object of the present invention to provide an improved, and more efficient and economical process for the production of arsanilic acid.

It is another object of the present invention to provide a new and improved process for the production of arsanilic acid which can be carried out with relatively minor modification of the equipment used in present-day commercial arsanilic acid production processes, but which achieves much greater process efficiency, and greater product yields than such present-day commercial processes.

These objects are achieved in the present invention through the use of a novel, solvent process for the production of arsanilic acid. This process comprises reacting arsenic acid with an excess of aniline at a reaction temperature of about 130° to 180° C. in the presence of a solvent which forms an azeotropic distillate with water formed in the reaction, to produce a mixture of arsanilic acid and di-(p-aminophenyl) arsenic acid. The mixture is then preferably diluted with water and the pH is desirably adjusted to about 8.5 to 10. After the aniline layer is removed, the aqueous layer is adjusted to a pH not greater than about 3.0 and then refluxed to hydrolyze the di-(p-aminophenyl) arsenic acid and convert it to arsanilic acid. In accordance with a preferred aspect of the present invention, a chelating agent is also incorporated in the reaction mixture to aid in securing high yields from the present process.

The invention consists in the novel methods, processes and improvements shown and described. It is to be understood that both the foregoing general description and the following detailed description are exemplary and explanatory, but are not restrictive of the invention.

In the present process, as in many prior art processes, arsenic acid is caused to react with an excess of aniline to produce the desired arsanilic acid product. However, unlike prior art processes, the reaction conditions of the present process do not minimize the side reaction which produces di-(-aminophenyl) arsenic acid. Instead, this compound is also produced during the first reaction, along with arsanilic acid. In a subsequent step of the present process, di-(p-aminophenyl) arsenic acid is converted into arsanilic acid, thereby maximizing the yield of the desired product.

The mol ratios of aniline to arsenic acid used in accordance with the present process can be varied rather widely while still achieving satisfactory results. Thus, product yields vary little with variations of aniline/arsenic acid molar ratios between 2 to 1 and 5.5 to 1. As the proportion of aniline to arsenic acid is lowered within this range, however, difficulties may be encountered in separation of the excess aniline phase from the product phase of the reaction mixture, and moreover, the reaction mass tends to become rather viscous and difficult to agitate. For these reasons, ratios of aniline to arsenic acid between 3 to 1 and 5 to 1 are preferred, with a ratio of about 4 to 1 being considered optimum.

In accordance with the invention, the aniline-arsenic acid reaction is carried out in the presence of a solvent which forms an azeotropic distillate with water present in the reaction. The reaction mixture contains water from two sources. Water is present in the reactants initially added to the reaction vessel, and water is also formed as a by-product of the reaction. Since the reaction is carried out at highly elevated temperatures, the water present from both sources is distilled or boiled off during the reaction.

The inclusion in the reaction mixture of a solvent that form an azeotropic distillate with water in accordance with the present process achieves a number of important advantages. If offers a means for controlling the reaction temperature by the refluxing system, and a means for more readily following and terminating the reaction on the basis of measurement of the water eliminated. The inclusion of the solvent provides an inert operating atmosphere and prevents aniline removal during the reaction. Thus, in accordance with this invention there is no need for concern that the ratio of aniline to arsenic acid ratio in the reaction mixture may be unduly lowered; and the present process can be successfully operated at aniline to arsenic acid mol ratios which are lower than those heretofore employed.

The presence of the solvent causes a better and cleaner separation of the aniline layer from the aqueous solution of reaction product present in the reaction mixture, and generally achieves better color in both layers. The presence of the solvent in the aniline phase of the reaction product also affords a means of drying the recovered aniline prior to its recycle.

Most important, the presence of the solvent in the aniline-arsenic acid reaction mixture has been found to result in unexpectedly improved yields of arsanilic acid product. The present process realizes yields in the range of 45 to 50% conversion of arsenic acid reactant to arsanilic acid. It is believed that these improved yields are, at least in part, a result of the more efficient water removal achieved by the azeotropic distillation of reaction witer in the process of this invention, which allows the reaction to proceed at a fast than normal rate.

Any solvent which forms an azeotropic distillate with water can be used as the solvent or azeotroping agent included in the reaction mixture in accordance with the present process. Toluene, benzene, xylene, and octane, for example, can be satisfactorily used. It is preferred, however, to use less flammable solvents such as perchloroethylene, perfluoroethylene, chlorobenzene, and ethylene dichloride. Perchloroethylene is presently considered an optimum azeotroping solvent for use in this process.

The amount of solvent or azeotroping agent included in the reaction mixture is small—only about 5 to 15 weight percent based on the arsenic acid charged to the reaction. The azeotroping solvent preferably is present in the reaction mixture in amounts between about 8 and 9% by weight of the arsenic acid reactant.

The present process is carried out at a reaction temperature between about 130° and 180° C. The process preferably includes a high temperature reaction in which the reaction mixture is heated at a temperature of about 173° to 175° C. during at least a portion of the reaction. In a most preferred form of the invention, the reaction mixture is gradually heated from an initial temperature of about 130° C. to 140° C. to a final temperature of about 173° C. to 175° C. over the reaction period.

During the reaction, water and solvent are azeotropically distilled from the reaction mixture. The yield of arsanilic acid increases with the use of higher reaction temperatures, and thus the use of temperatures in the 173° C. to 175° C. range during at least a portion of the reaction period is important in achieving optimum performance from the present process. The use of these high temperatures causes a faster reaction rate, aiding in the rapid removal of the water present in the reaction, and thereby increasing the productivity and efficiency of the reaction.

As the temperature of the reaction is increased above about 175° C., aniline distillation becomes excessive. Additionally, at temperatures of about 180° C. or higher, water surges may occur, causing purging of the batch reaction mixture. For this reason, the operating temperatures should generally not exceed about 178° C.

The reaction time utilized in the aniline-arsenic acid reaction can vary widely, for example, from about 20 minutes to about 3 hours or longer. A reaction period of about one and one-half (1½) hours at a maximum temperature of 175° C. is considered optimum.

The reaction is usually terminated after a predetermined amount of *reaction* water has been removed. The total water present in and removed from the reaction consists of a mixture of the water initially present in the arsenic acid reactant, water added with the chelating agent where one is used, and water produced in the reaction. A correction factor must thus be applied to the total amount of water removed, to ascertain how much of it is *reaction* water. It has been found that optimum product yields are realized if the reaction is terminated after the removal of about 1.25 to 1.5 mols of reaction water per mol of arsenic acid charged. This normally corresponds to about 2.7 to 3.1 mols of total water per mol of arsenic acid charged.

In accordance with a preferred form of the present process, a minor amount of a chelating agent is included in the reaction mixture. The sodium salt of ethylenediaminetetraacetic acid, which can be obtained commercially as "Versene" from Dow Chemical Company, or as "Hamp-ene 215" from Hampshire Chemical Corp., is a particularly effective chelating agent. The amount of chelating agent added to the reaction mixture can vary from about 0.2 to 2% by weight of the arsenic acid reactant, with about 0.3% of chelating agent based on the weight of the arsenic acid reactant being optimum.

It is believed that the use of a chelating agent in the reaction mixture in accordance with the process of this invention minimizes the catalytic effect of heavy metal impurities, such as copper, on the oxidation of the aniline in the reaction mixture, thereby allowing the effective use of higher temperatures in the reaction without undesirable levels of aniline oxidation. The use of higher reaction temperatures accelerates the speed of the reaction and the speed of water removal, and thereby contributes to the achievement of the high yields of the present process.

The aniline-arsenic acid reaction of the present process produces a reaction product which comprises a mixture of arsanilic acid and di-(p-aminophenyl) arsenic acid. In fact, the use of the process of this invention causes greatly increased conversion of the arsenic acid reactant to di-(p-aminophenyl) arsenic acid, rather than arsanilic acid. The present process, however, provides for the conversion of this di(p-aminophenyl) arsenic acid to arsanilic acid, and thereby uses this mechanism to achieve higher overall conversion of arsenic acid reactant to ultimate product.

The mechanism by which arsanilic acid is produced in accordance with the process of this invention is shown by Equation I below:

I

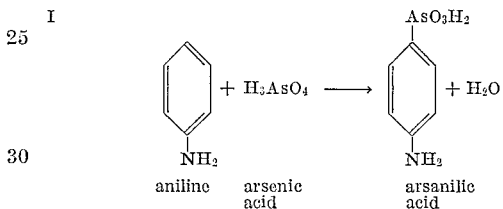

aniline    arsenic    arsanilic
           acid       acid

The di-(p-aminophenyl) arsenic acid portion of the reaction product is formed by the further reaction of a portion of the arsanilic acid product of Equation I with excess aniline in the reaction mixture, in accordance with Equation II.

II

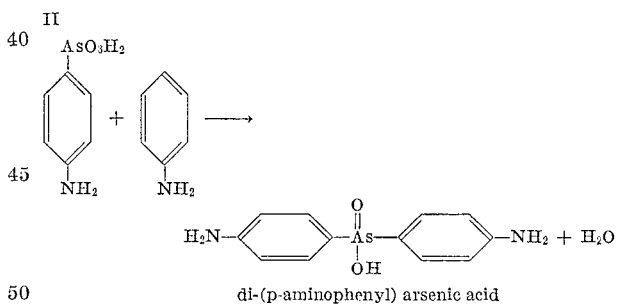

di-(p-aminophenyl) arsenic acid

Both reactions produce by-product water which is removed by azeotropic distillation with the solvent present in the reaction mixture.

Following the aniline-arsenic acid reaction, the crude reaction mixture thus comprises arsanilic acid, di-(p-aminophenyl) arsenic acid, azeotropic solvent such as perchloroethylene, chelating agent, excess aniline, color bodies, and a small amount of tri-(p-aminophenyl) arsene oxide. At this stage of the process, approximately 65 to 70% of the ultimate arsanilic acid product is present in the crude reaction product mixture as di-(p-aminophenyl) arsenic acid.

Prior to hydrolysis of the reaction mixture to convert the di-(p-aminophenyl) arsenic acid to arsanilic acid, the crude reaction product mixture is separated into an aniline layer and an aqueous, product layer. This separation is achieved by cooling the reaction product mixture, diluting it with water, and adding sufficient sodium hydroxide (or other base) to adjust the pH of the overall mixture to about 8.5 to 10.

The reaction product mixture is preferably diluted with about 2½ parts of water per part of arsenic acid reactant initially used, and the pH is then preferably adjusted to about 9.0 with sodium hydroxide. The mixture is then agitated at 90° C. to 95° C. for a short time and allowed to settle.

The lower aqueous phase, containing the crude reaction product to be hydrolyzed in accordance with the present process, is then separated by decantation or the like from the upper aniline phase which contains most of the color bodies, the solvent, the chelating agent, and the by-product tri-(p-aminophenyl) arsene oxide. The presence of the solvent in the reaction mixture, in accordance with the present process, appears to enhance this layer separation. Thus, only about 3 to 5% by weight of the aqueous phase is generally carried into the upper aniline layer, and only about 1 to 2% by weight of aniline is generally retained in the lower aqueous phase. The aqueous phase should be maintained at a temperature above about 60° C. during this separation to avoid solids precipitation.

The crude aniline layer precipitates the tri-(p-aminophenyl) arsene oxide on cooling. This undesired by-product is removed by filtration, and the aniline is purified by distillation for recycle to the initial reaction vessel.

The aqueous layer containing the crude reaction product in the form of a mixture of arsanilic acid and di-(p-aminophenyl) arsenic acid is preferably steam-stripped or the like to remove residual aniline before the mixture is hydrolyzed in accordance with the present process. The crude aqueous layer may also be purified at this stage by filtration through carbon, if desired.

The aqueous phase is then acidified to a pH between about 1 and 3, and preferably between about 2.0 and 3.0 and refluxed to hydrolyze the di-(p-aminophenyl) arsenic acid and convert it to arsanilic acid. A pH of 2 to 2.5 is considered optimum during hydrolysis, since no substantial improvement results from the use of lower pHs and substantially the same result can thus be achieved at a lesser cost through the use of less acid at a pH of 2 to 2.5. Product loss due to hydrolysis of arsanilic acid increases as the pH is raised above 3.0, with drastic products losses occurring as the pH is raised above about 4.0.

The hydrolysis can be carried out either at atmospheric pressure or at superatmospheric pressures. If atmospheric pressure is used, the reflux temperature will vary between about 100° C. and 105° C. If superatmospheric pressures are used, the temperature of hydrolysis can be raised to 115° C. to 125° C., for example.

It has been determined that in commercial operation hydrolysis periods on the order of 7 to 9 hours should be used to hydrolyze the crude reaction product, containing di-(p-aminophenyl) arsenic acid, at atmospheric pressure. Much shorter hydrolysis times, on the order of 1 to 2 hours, can be used at hydrolysis temperatures of 125° C. and 115° C., respectively. Only slightly elevated pressures, generally not exceeding 24 p.s.i.g. need to be used in these high temperature hydrolysis procedures.

The hydrolysis reaction of the present process is illustrated in Equation III below.

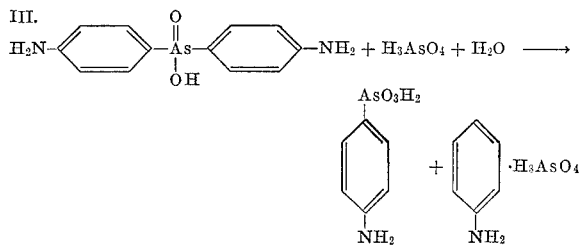

Because of the formation of aniline in this hydrolysis reaction, a slight pH drift may occur during hydrolysis. If an initial pH of 3.0 is used in the hydrolysis, it may be desirable to add additional acid during the reaction. If an initial pH of 2.0 is used in the hydrolysis, no adjustment in pH is generally necessary.

The hydrolysis step of the present process converts substantially all of the di-(p-aminophenyl) arsenic acid present in the aqueous layer to arsanilic acid. Crude arsanilic acid is then precipitated from the hydrolyzed liquor by cooling to 15° to 25° C. and holding at this temperature until precipitation occurs. Normally about 2 to 3 hours is required for complete precipitation.

The crude arsanilic acid product precipitates as a fine, grainy solid which is separated readily by filtration. The pressed filter cake normally contains about 64 to 68% solids. Washing of the crude cake with water aids in the removal of adhering salts and arsenic acid. Drying yields a crude product of pale purple color which contains 80 to 85% arsanilic acid.

The aniline formed in the hydrolysis reaction can be recovered by adjusting the filtrate obtained after the removal of the arsanilic acid to pH 8. This liberates the aniline which can be removed by layer separation or preferably by steam-stripping at this pH. Reacidification of the alkaline solution, after removal of the aniline, gives a small amount of additional product; however, this is usually difficult to purify.

The crude arsanilic acid separated from the hydrolysis liquor is preferably further purified by dissolving it in NaOH solution, heating the solution with carbon for about 30 minutes at 80° to 100° C., filtering hot to remove the carbon and then reprecipitating the arsanilic acid by acidification of the alkaline solution to about pH 3 at 60° C. or above followed by cooling to about 25° C. Acidification at a temperature above 60° C. gives a more readily filterable product. The purified product, which is removed by filtration, is equivalent in quality to commercially available arsanilic acid.

High-quality arsanilic acid is prepared by the present process in yields of 45 to 50% based on arsenic acid reactant. The yields achieved by the present process thus are 80 to 90% above the yields achieved by present-day commercial processes.

The present process can be carried out with only minor modification of conventional equipment used in the present-day commercial arsanilic acid production processes. Ready use can thus be made of this process to achieve greatly improved efficiency and economy in the production of arsanilic acid.

For a clearer understanding of the invention, specific examples of it are set forth below. These examples are merely illustrative and are not to be understood as limiting the scope and underlying principles of the invention in any way.

EXAMPLE 1

In this example, 745 grams of aniline and 30 grams of perchloroethylene are charged to a 2 liter, 3-necked flask equipped with a stirrer, addition funnel, thermometer, condenser, and water separator. The water separator is arranged so that the lower perchloroethylene layer of the azeotropic distillate formed in the reaction can be returned to the flask while the upper water layer can be removed as it is formed. The flask is heated with a Glascol mantle and the temperature of the contents raised to 130 to 135° C. A solution containing 4 grams of the sodium salt of ethylenediaminetetraacetic acid (Versene, produced by Dow Chemical Company) and 342.5 grams of arsenic acid (82.8% in water) is charged to the reaction vessel over about a 20-minute period.

The water present in the reaction mixture begins to azeotrope during the acid addition and is removed from the reaction vessel. The solvent distillate layer is returned to the reaction mixture. After completion of the arsenic acid addition, the temperature of the reaction mixture is gradually raised to 173° C. to 175° C. over a period of 1½ to 1¾ hours. During this period a total of 110.3 grams of water is removed from the reaction.

The batch is then quickly cooled to 100° C., and 925 grams of a 13.5% aqueous solution of sodium hydroxide is added to adjust the pH of the reaction product mixture to about 9. The product is agitated for about 30 minutes at 90° C. to 95° C. and then transferred to a separatory funnel where the layers are allowed to separate for about 30 minutes. This separation yields a lower aqueous layer (1330 grams) and an upper aniline layer (606.5 grams).

The separated aqueous phase is treated with 10 grams of carbon powder (Nuchar C–190, produced by West Virginia Pulp and Paper Co.), and steam-stripped to remove an azeotropic mixture which separates as an aniline layer containing 95% by weight of aniline and an aqueous layer containing 3.7% by weight of aniline. The residual, hot, aqueous reaction product solution is then filtered to remove the carbon, and the carbon cake is washed with 150 grams of hot water and the filtrate combined with the aqueous reaction product solution.

The solution is then adjusted to pH 2.0 by the addition of 334 grams of concentrated hydrochloric acid at a temperature of about 65° C. The acidified solution is refluxed at 104° C. and atmospheric pressure for 7 hours to hydrolyze the di-(p-aminophenyl) arsenic acid present, and then cooled to 15° C. over 30 to 45 minutes. The pH of the solution after hydrolysis is 2.3 at 60° C. The hydrolyzed solution is held at about 15° C. for 2 hours to allow precipitation of crude arsanilic acid.

The crude, precipitated product is filtered and washed twice on the filter with 100 ml. portions of cold water. The wet filter cake weighs 309 grams and is dried to yield 237.7 grams of a pale purple product. This crude arsanilic acid is purified by charging it to a flask along with 1320 grams of fresh water, adding 15 grams of powdered carbon, adjusting the pH of the mixture to 8.0 by adding 55.5 grams of solid sodium hydroxide, and heating for ½ hour at 80° C. to 100° C. The mixture is then filtered while hot and the filtrate adjusted to a pH of 3.0 by the addition of 127 grams of concentrated HCl at 60° C. Prior to acidifying, the carbon cake is washed with water and the filtrate combined with the main filtrate. After acidification, the combined filtrates are cooled to 15° C. and held at this temperature 2 hours. A purified arsanilic acid product is removed by filtration.

This product, after drying, comprises 202.2 grams of arsanilic acid having excellent color and shown by analysis to contain 34.5% arsenic, 6.4% nitrogen, 0.019% arsenite (as $As_2O_3$), and 0.05% arsenate (as $As_2O_4$). The product yield based on the arsenic acid reactant is 46.6%. This product meets Food and Drug Administration minimum standards for veterinary use, which require the presence of 34 to 34.8% arsenic, not more than 0.05% arsenite (calculated as $As_2O_3$), and not more than 0.05% arsenate.

EXAMPLE 2

This example illustrates the production of arsanilic acid by the present process on a commercial scale. In this example, a reactor is initially charged with 357.5 lbs. of aniline and 15.3 lbs. of perchloroethylene, and this mixture is heated to about 130° C. A solution containing 160 lbs. of arsenic acid (85% in aqueous solution) and 1.4 lbs. of a 33.3% aqueous solution of sodium ethylenediaminetetraacetic acid (Versene) is gradually added while maintaining the temperature at about 130° C. After completion of the acid addition, the temperature is gradually raised to 173° C. to 175° C., and water is azeotropically distilled and removed from the reaction, both during the acid addition and during the heating. Heating is continued for about 2 hours following completion of the arsenic acid addition, and about 2.9 mols of total water per mol of arsenic acid reactant are removed from the reaction during this period. The temperature of the reaction product is then quickly reduced to 105° C. and the reaction product is diluted by the addition of 383.5 lbs. of water and 60 lbs. of solid sodium hydroxide to adjust the pH of the solution to about 9.0. The solution is then agitated for about 30 minutes at 90° C. to 95° C. and separated into an upper aniline phase containing aniline, solvent, most of the color bodies and by product tri-(p-aminophenyl) arsene oxide, and a lower aqueous phase containing the crude reaction products.

The lower aqueous phase is steam stripped to remove residual aniline, and acidified to pH 2.0 by the addition of 163.5 lbs. of 38% hydrochloric acid. The batch is then heated at reflux for 1 hour at 125° C. under 20 p.s.i.g. pressure to hydrolyze the di-(p-aminophenyl) arsenic acid present in the reaction product. Crude arsanilic acid is precipitated from the hydrolyzed liquor by cooling it to about 20° C. and holding it at that temperature for about 2½ hours. The product is separated by filtration and the wet filter cake redissolved by the addition of 600 lbs. of water and 28 lbs. of solid sodium hydroxide. The solution is treated with 7.2 lbs. of carbon powder (Nuchar C–190), separated by filtration, and then reprecipitated by the addition of 67.3 lbs. of 38% hydrochloric acid to reduce the pH of the solution to about 3.0. The dried product comprises 100 lbs. of high purity arsanilic acid.

EXAMPLES 3–10

The general procedure of Example 1 is repeated in each of these examples, using the specific reaction conditions set forth in Table I below. The product of each of these examples is highly purified arsanilic acid meeting the requirements of the Food and Drug Administration, and in each example, the arsanilic acid product is produced in high yields on the order of 40 to 50%, based on the arsenic acid reactant.

TABLE I

| | (WW–77–29) | (AA–34–65) | (AA–34–87) | (AA–35–1) | (AA–35–13) | (AA–35–17) | (AA–33–83) | (AA–35–21) |
|---|---|---|---|---|---|---|---|---|
| Example No | 3 | 4 | 5 | 6 | 7 | 8 | 9 | 10 |
| Aniline/arsenic acid, mol ratio | 5.5/1 | 5.5/1 | 5.5/1 | 2/1 | 3/1 | 4/1 | 5.5/1 | 4/1 |
| Solvent type | Toluene | (¹) | ² PCE | PCE | PCE | PCE | Toluene | PCE |
| Solvent amount, gms | 40 | 50 | 50 | 24 | 33 | 50 | 100 | 50 |
| Reaction temp., ° C | 160–171 | 160–178 | 106–177 | 160–178 | 160–180 | 160–175 | 158 | 160–175 |
| Reaction time, hrs | 2½ | 2⅚ | 1½ | 1½ | 1¼ | 1¼ | 3 | 1½ |
| Hydrolysis pH (initial-final) | 2.0–2.2 | 2.0–3.0 | 2.0–2.4 | 2.0–2.3 | 2.0–2.3 | 2.0–2.3 | 3.0–3.4 | 2.3–3.0 |
| Hydrolysis temp., ° C. (time, hrs.) | 105 (7) | 104 (5) | 104 (7) | 104 (5) | 104 (7) | 104 (7) | 104 (6) | 125 (1) |
| Yield of arsanilic acid, percent based on arsenic acid | 47.7 | 46.4 | 49.5 | 49.0 | 48.0 | 47.5 | 43.0 | 44.5 |
| Product analysis, percent: | | | | | | | | |
| Arsenic | 34.05 | 34.26 | 34.03 | 34.19 | 34.50 | 34.37 | 34.43 | 34.38 |
| Nitrogen | 6.4 | 6.6 | 6.2 | 6.4 | 6.4 | 6.4 | 6.4 | 6.3 |
| Arsenite | 0.011 | 0.01 | 0.01 | 0.025 | 0.01 | 0.016 | 0.01 | 0.013 |
| Arsenate | <0.05 | <0.05 | <0.05 | <0.05 | <0.05 | <0.05 | <0.05 | <0.05 |

¹ Chlorobenzene. ² Perchloroethylene.

A sample of the arsanilic acid produced in Example 8 is water washed, and reacted with cyanic acid in accordance with conventional procedures to produce N-carbamoylarsanilic acid, a commercial veterinary treating agent. A yield of about 98% of the desired product (on a weight basis) is obtained.

The invention in its broader aspects is not limited to the specific details shown and described, but departures may be made from such details without departing from the principles and spirit of the invention, and without sacrificing its chief advantages.

What is claimed is:
1. A process for preparing arsanilic acid which comprises:
   reacting a mixture comprising arsenic acid and a molar excess of aniline at a temperature from about 130°

C. to 180° C. in the presence of a solvent which forms an azeotropic distillate with water present in the reaction mixture to form arsanilic acid and di-(p-aminophenyl) arsenic acid as products;

separating excess aniline from the mixture;

adjusting the pH of the mixture to a value not greater than about 3; and heating the mixture to convert the di-(p-aminophenyl) arsenic acid to arsanilic acid by hydrolysis.

2. The process of claim 1 wherein the reaction mixture includes a chelating agent.

3. The process of claim 1 wherein at least a portion of the reaction between arsenic acid and aniline is carried out at a temperature of about 173° C. to 175° C.

4. The process of claim 3 wherein the aniline and arsenic acid are present at a molar ratio between about 2:1 and about 5.5:1.

5. The process of claim 4 wherein the reaction mixture includes a chelating agent.

6. The process of claim 5 wherein the chelating agent is a salt of ethylenediaminetetraacetic acid and is present in an amount between about 0.2 and 2% by weight of the arsenic acid.

7. The process of claim 4 in which the azeotropic solvent is present in the reaction mixture in an amount between about 5 and 15% by weight of the arsenic acid reactant.

8. The process of claim 4 in which the solvent is perchloroethylene.

9. The process of claim 4 in which the arsenic acid-aniline reaction is initiated at a temperature of about 130° C. to 140° C. and the reaction temperature is gradually raised to about 175° C. with the final portion of the reaction being carried out at a temperature of about 173° C. to 175° C.

10. The process of claim 4 in which the hydrolysis of the di-(p-aminophenyl) arsenic acid is carried out at a pH between about 2 and 3.

11. The process of claim 10 in which the hydrolysis is carried out by heating the product mixture at a temperature of about 100° C. to 105° C. at atmospheric pressure.

12. The process of claim 10 in which the hydrolysis is carried out by heating the product mixture at a temperature of about 115° C. to 125° C. at superatmospheric pressure.

References Cited

UNITED STATES PATENTS

| | | | |
|---|---|---|---|
| 1,405,228 | 1/1922 | Kober | 260—442 |
| 2,245,572 | 6/1941 | Christiansen | 260—442 |
| 2,677,696 | 5/1954 | Rundell et al. | 260—442 |
| 3,296,290 | 1/1967 | Berndt et al. | 260—442 |
| 3,414,601 | 12/1968 | Harris et al. | 260—442 |

JAMES E. POER, Primary Examiner

W. F. W. BELLAMY, Assistant Examiner